Figure 1:
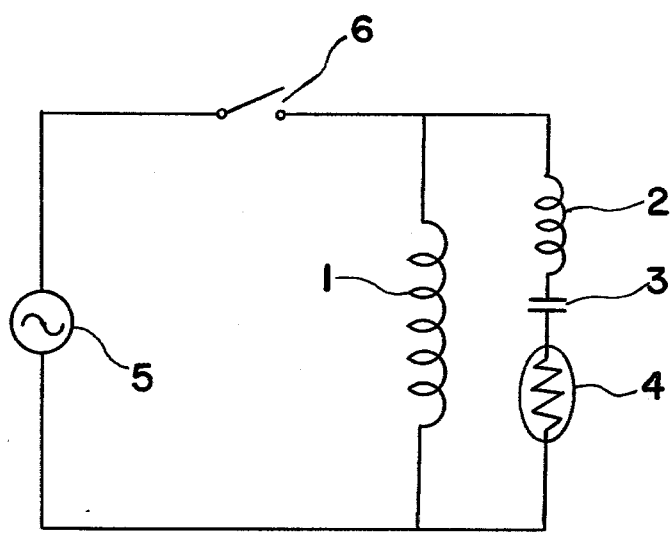

United States Patent [19]

Mandai

[11] 4,191,665

[45] Mar. 4, 1980

[54] BARIUM TITANATE SEMICONDUCTOR CERAMIC COMPOSITIONS

[75] Inventor: Harufumi Mandai, Nagaokakyo, Japan

[73] Assignee: Murata Manufacturing Co., Ltd., Nagaokakyo, Japan

[21] Appl. No.: 941,858

[22] Filed: Sep. 13, 1978

[30] Foreign Application Priority Data

Sep. 16, 1977 [JP] Japan .................................. 52/111806

[51] Int. Cl.$^2$ ........................ H01B 1/08; C04B 35/46
[52] U.S. Cl. ............................ 252/520; 252/62.3 BT; 252/521
[58] Field of Search ................. 252/62.3 BT, 520, 521; 106/73.3, 73.31

[56] References Cited

U.S. PATENT DOCUMENTS

| 2,985,700 | 5/1961 | Johnston | 252/520 X |
| 4,101,454 | 7/1978 | Kulwicki et al. | 252/520 X |

FOREIGN PATENT DOCUMENTS 48-14709  2/1973  Japan .................................. 252/62.3 BT

*Primary Examiner*—Jack Cooper
*Attorney, Agent, or Firm*—Birch, Stewart, Kolasch & Birch

[57] ABSTRACT

A barium titanate semiconductor ceramic composition which consists essentially of a basic component of barium titanate wherein 5 to 20 mol% of Ba is replaced with Ca, and contains 0.30 to 0.90 mol% of Ho and 0.10 to 0.18 mol% of Mn. The composition enables to produce semiconductor devices with a positive temperature characteristic and a high breakdown voltage, such as PTC thermistors.

1 Claim, 1 Drawing Figure

BARIUM TITANATE SEMICONDUCTOR CERAMIC COMPOSITIONS

BACKGROUND AND SUMMARY OF THE INVENTION

The present invention relates to barium titanate semiconductor ceramic compositions and, more particularly, to novel barium titanate semiconductor ceramics with a high breakdown voltage.

It has been known that barium titanate is an insulator having high resistivity more than $10^{10}$ Ω. cm, and can be converted into semiconductor ceramics having resistivity of not more than $10^6$ Ω. cm by incorporating a minor quantity of one or more doping elements such as Bi, Nb, W, Ta, Sb, and rare earth elements thereinto. Barium titanate semiconductor ceramics possess a positive resistance-temperature characteristic that the resitivity thereof is abruptly increased in a certain temperature range, so that these semiconductor ceramics have been used for positive temperature coefficient thermistors (hereinafter called as PTC thermistors) useful as current limiter, current stabilizers, thermal controllers, thermostatic heating elements, etc. In practical use, for example, when a PTC thermistor is used as a current control element for starting a motor, as shown in the accompanying drawing, the PTC thermistor 4 and a starting capacitor 3 are connected in series with an auxiliary coil 2 being connected in parallel with a main coil 1. When a switch 6 in the circuit is closed, current from a power source 5 flows through the main coil 1, and also through the series circuit of auxiliary coil 2 and capacitor 3 since the PTC thermistor 4 has a low initial value of resistance at a low temperature, making the motor turn. With the lapse of time, the PTC thermistor 4 is increased the resistance by its self-heating effect, thereby limitting the current flowing through the auxiliary coil 2.

When semiconductor ceramics are to be used as materials for PTC thermistors designed for the above application, they are required to have low resistivity at low temperature to allow a large current to flow through the auxiliary coil 2 when starting the motor. It is also required that they can stand a high voltage to be applied, and ensure that the starting current can flow for a relatively long time after the switch is closed.

As a semiconductor ceramic material for such application, we have previously proposed a barium titanate semiconductor ceramic containinng samarium (Sm) and manganese (Mn). PTC thermistors formed of such a semiconductor ceramic have improved electrical properties, but also have the disadvantage that abnormal heat generation occurs at their central region when a large inrush current flows through the thermistor at the application of a high voltage, resulting in the break-down phenomenon. Further, because the curie temperature at which the resistivity of the ceramic increases abruptly is low and, approximately 115°0 C., the motor starting time is too short to provide sufficient starting torque. As a method for solving the above disadvantage, it may be proposed to relace a part of Ba in the above ceramic compositions with Pb or Sr. The partial replacement of Ba with Pb contributes to shifting the curie temperature to a higher temperature, thus making it possible to produce PTC thermistors which enable to extend the starting time of motors. However, such PTC thermistors cannot be used in practice because their breaakdown voltage is considerably lowered by the partial replacement of Ba with Pb. The partial replacement of Ba with Sr contributes to rising the breakdown voltage with the disadvantage that the curie temperature is lowered. Thus, neither of the above methods can be accepted as an appropriate solution.

It is a main object of the present invention to provide improved barium titanate semiconductor ceramic compositions having a high breakdown voltage and being useful as materials for electronic elements such as PTC thermistors designed for starting motors and the like.

According to the present invention, there is provided a barium titanate semiconductor ceramic composition consisting essentially of a basic component of barium titanate wherein 5 to 20 mol% of Ba is replaced with Ca, and containing 0.30 to 0.90 mol% of Ho and 0.10 to 0.18 mol% of Mn. In brief, a barium titanate semiconductor ceramic composition of the present invention may be expressed by the following general formula:

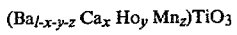
$$(Ba_{1-x-y-z} Ca_x Ho_y Mn_z)TiO_3$$

wherein x, y, and z are respective mol fractions, and may have values in the following range:

$0.05 \leq x \leq 0.20$
$0.0030 \leq y \leq 0.0090$
$0.010 \leq z \leq 0.0018$

The reason why the amount of substitution of Ca has been limited as being in the range of 5 to 20 mol% is that the content of Ca less that 5 mol% or more than 20 mol% results in the increase of the resistivity at room temperature and the lowering of breakdown voltage of ceramics. The content of Ho has been limited as being in the range of 0.30 to 0.90 mol% for the reasons that the content of Ho out of the above range results in increase of the resistivity at room temperature and makes it impossible to increase the breakdown voltage. The content of Mn has been limited as being in the range of 0.10 to 0.18 mol% for the reasons that the content of Mn out of the above range results in the increase of the resistivity at room temperature.

Other objects, features and advantages of the present invention will be further apparent from the following description with respect to examples.

EXAMPLE 1

Using $BaCO_3$, $CaCO_3$, $TiO_2$, $La_2O_3$, $CeO_2$, $Pr_2O_3$, $Nd_2O_3$, $Sm_2O_3$, $Gd_2O_3$, $Ho_2O_3$, $DY_2O_3$, $Y_2O_3$, and $MnCO_3$ as raw materials, there are prepared mixtures to produce semiconductor ceramics having a composition expressed by the general formula:

$$(Ba_{0.8485-x}Ca_{0.15}Me_xMn_{0.0015})TiO_3$$

wherein Me is La, Ce, Pr, Nd, Sm, Gd, Ho, Dy, or Y, each composition having a compositional proportion shown in Table 1. Each mixture is milled in a pot-mill by the wet process for 10 hours, dehydrated, dried and then calcined at 1150° C. for 1 hour. The resultant presintered body is crushed, added with vinyl acetate as a binder, and then milled. The resultant powder is shaped into discs having a diameter of 24 mm and thickness of 6.0 mm by a hydraulic press under a pressure of 700 to 900 Kg/cm$^2$, and then fired in air at a temperature of 1300° to 1350° C. for 1 hour to produce ceramic discs. On both surfaces of the disc, an ohmic contact is provided by an indium-gallium alloy.

The thus obtained samples are subjected to measurement of resistivity and breakdown voltage at 25° C. in air. Results are shown in Table 1. In the table, the breakdown voltage represents the maximum value of the voltage at which the ceramic is breakdown by applying instantaneous voltage, which increases with the lapse of time, between ohmic contact electrodes.

As can be seen from Table 1, ceramics of samples Nos. 19–21 having a composition consisting essentially of calcium modified barium titanate containing Ho and Mn have a high breakdown voltage, compared with the ceramics having otherr compositions. Especially, when compared with ceramics of samples Nos. 13–15 containing Sm, of which the amounts are the same as those of Ho in samples Nos. 19–21, ceramics of the samples Nos. 19–21 containing Ho have high breakdown voltage and the improved extent of the breakdown voltage is of the order of about 60 to 80 %.

Table 1

| Sample No. | Me | X | Resistivity (Ω . cm) | Breakdown voltage (V) |
|---|---|---|---|---|
| 1 | La | 0.003 | 153 | 280 |
| 2 | " | 0.004 | 40 | 150 |
| 3 | " | 0.005 | — | — |
| 4 | Ce | 0.003 | 205 | 300 |
| 5 | " | 0.004 | 39 | 170 |
| 6 | " | 0.005 | 340 | 400 |
| 7 | Pr | 0.003 | 138 | 260 |
| 8 | " | 0.004 | 42 | 180 |
| 9 | " | 0.005 | 210 | 355 |
| 10 | Nd | 0.004 | 87 | 305 |
| 11 | " | 0.005 | 65 | 190 |
| 12 | " | 0.006 | 404 | 440 |
| 13 | Sm | 0.004 | 55 | 230 |
| 14 | " | 0.005 | 38 | 180 |
| 15 | " | 0.006 | 197 | 370 |
| 16 | Gd | 0.004 | 63 | 225 |
| 17 | " | 0.005 | 59 | 225 |
| 18 | " | 0.006 | 206 | 310 |
| 19 | Ho | 0.004 | 47 | 350 |
| 20 | " | 0.005 | 37 | 320 |
| 21 | " | 0.006 | 166 | 470 |
| 22 | Dy | 0.004 | 106 | 300 |
| 23 | " | 0.005 | 42 | 200 |
| 24 | " | 0.006 | 885 | 280 |
| 25 | Y | 0.004 | 97 | 300 |
| 26 | " | 0.005 | 46 | 175 |
| 27 | " | 0.006 | 256 | 380 |

EXAMPLE 2

Using $BaCO_3$, $CaCO_3$, $TiO_3$, $Ho_2O_3$ and $MnCO_3$ as raw materials, there are prepared mixtures to produce semiconductor ceramics having a composition expressed by the general formula:

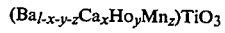

$(Ba_{1-x-y-z}Ca_xHo_yMn_z)TiO_3$ wherein x, y and z are mol fractions of respective components, each composition having a compositional proportion shown in Table 2. Each mixture is treated in the same manner as in Example 1.

The semiconductor ceramics obtained are subjected to measurement of resistivity and breakdown voltage in the same manner as in Example 1. Results obtained are shown in Table 2. In Table 2, an asterisk (*) designates a ceramic having a composition out of the compositional area defined by the present invention.

Table 2

| Sample No. | Ca (=x) | Ho (=y) | Mn (=z) | Resistivity (Ω . cm) | Breakdown voltage (V) |
|---|---|---|---|---|---|
| 28* | 0 | 0.006 | 0.0015 | 68 | 205 |
| 29 | 0.10 | 0.006 | 0.0015 | 52 | 345 |
| 30* | 0.10 | 0.002 | 0.0015 | 280 | 400 |
| 31* | 0.10 | 0.006 | 0.0005 | 123 | 320 |
| 32 | 0.05 | 0.005 | 0.0010 | 88 | 410 |
| 33 | 0.15 | 0.003 | 0.0015 | 40 | 325 |
| 34 | 0.20 | 0.009 | 0.0015 | 77 | 395 |
| 35 | 0.15 | 0.009 | 0.0018 | 112 | 410 |
| 36* | 0.30 | 0.005 | 0.0015 | 155 | 320 |
| 37* | 0.15 | 0.005 | 0.0020 | 330 | 440 |

From the results in Table 2, it will be seen that the partial substitution of Ca for Ba and the incorporation of Ho and Mn into barium titanate contribute increase of the breakdown voltage and lowering of the resistivity at room temperature of ceramics. Further, it is also understood that the content of Ca, Ho and Mn has great influence on the electrial properties a follows: Firstly, the comparison of the results for samples Nos. 28 and 29 shows that the substition of Ca for Ba in an appropriate amount contributes to increase of the breakdown voltage, and lowering of the resistivity at room temperature. Secondly, as can be seen from the results for sample No 36, the calcium substitution in an excess amount out of the aforesaid range results in the increase of the resistivity at room temperature. Thirdly, as can be seen from the results for sample No. 30, the incorporation of Ho in a small amount out of the aforesaid range contributes to rise of breakdown voltage, but causes considerable increase of the resistivity at room temperature. The ceramic of sample No. 30, therefore, cannot be used in practice. Fourthly, the incorporation on Mn in a small amount out of the range results in the increase of the resistivity and lowering of breakdown voltage, as can be seen from the comparison of the results for samples Nos. 29 and 31. Lastly, as can be seen from the results for sample No. 37, the incorporation of excess Mn results in the considerable increase of the resistivity at room temperature, thus making it impossible to put the ceramics to practical use.

For comparison of the semiconductor ceramics of the present invention with prior art ceramic containing Sm, semiconductor ceramics with positive temperature coefficient are used as current limiting elements. The semiconductor ceramic containing Sm is prepared in the same manner as mentioned in Example 1 so as to have the following composition:

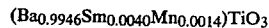

$(Ba_{0.9946}Sm_{0.0040}Mn_{0.0014})TiO_3$

As a semiconductor ceramic of the present invention, sample No. 33 is employed.

In order to make a comparative review, a resistance of 4 Ω was connected to a semiconductor ceramic in series, and a current of 165V was applied to the line, whereupon the time required for the current to be reduced to one-half its initial valve was measured, which was taken as the actuating time for limiting the current. Results obtained are shown in Table 3 together with their electrical properties.

Table 3

| | Resistivity (Ω . cm) | Breakdown voltage (V) | Curie temperature(°C.) | Actuating time (sec) |
|---|---|---|---|---|
| Specimen | 40 | 260 | 115 | 0.49 |

Table 3-continued

|  | Resistivity ($\Omega \cdot cm$) | Breakdown voltage (V) | Curie temperature (°C) | Actuating time (sec) |
|---|---|---|---|---|
| contg. Sm Specimen No. 33 | 40 | 325 | 125 | 0.54 |

As can be seen from Table 3, the semiconductor ceramic according to the present invention has a high breakdown voltage and a long actuating time, thus, it is most suitably usuable for starting a motor. Generally, with the rise of the Curie temperature the breakdown voltage is lowered, but the semiconductor ceramic according to the present invention has the advantage that it has a high Curie temperature and yet a high breakdown voltage.

It is known to incorporate $TiO_2$ and $SiO_2$ known as mineralizing agents into the barium titanate semiconductor ceramic. Thus, in the case of the present invention alike, it is allowable for $TiO_2$ and $SiO_2$ to be present in the ceramic by an amount not exceeding 3.0 mol%, respectively.

As described above, according to the present invention, due to the co-presence of Ho and Mn in the barium titanate component wherein Ca is substituted for a part of Ba, the semiconductor ceramics have an excellent characteristic of resistance to voltage and is especially useful as materials for PTC thermistors designed for starting a motor.

What I claim is:

1. The barium titanate semiconductor ceramic composition consisting essentially of the composition expressed by the general formula:

$(Ba_{1-x-y-z}Ca_xHo_yMn_z)TiO_3$ wherein x, y and z are respective mol fractions and have values in the following respective ranges:

$0.05 \leq x \leq 0.20$
$0.0030 \leq y \leq 0.0090$
$0.0010 \leq z \leq 0.0018.$

* * * * *